United States Patent
Katagiri (10) Patent No.: US 8,234,443 B2
(45) Date of Patent: Jul. 31, 2012

(54) CONTROLLING WRITING TO MAGNETIC TAPE

(75) Inventor: Takashi Katagiri, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 12/264,951

(22) Filed: Nov. 5, 2008

(65) Prior Publication Data

US 2009/0063763 A1    Mar. 5, 2009

(30) Foreign Application Priority Data

Nov. 5, 2007   (JP) ................................ 2007-287891

(51) Int. Cl.
*G11B 15/44* (2006.01)
*G06F 12/00* (2006.01)

(52) U.S. Cl. ...................... 711/111; 360/73.06; 360/74.1

(58) Field of Classification Search ........................ None
See application file for complete search history.

(56) References Cited

U.S. PATENT DOCUMENTS

| | | | |
|---|---|---|---|
| 5,210,829 A | 5/1993 | Bitner | |
| 5,412,780 A | 5/1995 | Rushton | |
| 7,023,651 B1 * | 4/2006 | Peterson | 360/77.12 |
| 7,107,397 B2 | 9/2006 | Dahman et al. | |
| 7,266,636 B2 * | 9/2007 | Jaquette | 711/111 |
| 7,631,141 B2 * | 12/2009 | Watanabe | 711/111 |
| 2007/0079059 A1 * | 4/2007 | Itagaki et al. | 711/111 |

FOREIGN PATENT DOCUMENTS

JP            10-199071        7/1998

* cited by examiner

*Primary Examiner* — Gary Portka
(74) *Attorney, Agent, or Firm* — Richard M. Kotulak (57) ABSTRACT

A method for controlling writing for a tape recorder that is connected to a host and sequentially records, as a transaction, a plurality of records that are transferred from the host and stored in a buffer is provided, including receiving a synchronous command for a first transaction from the host; in response to the synchronous command, sequentially writing the plurality of records stored in the buffer to a tape as the first transaction; receiving the size of a second transaction following the first transaction from the host; calculating time for a backhitch associated with an operation of the synchronous command for the first transaction on the basis of the size; and performing the backhitch on the basis of the time for the backhitch.

11 Claims, 8 Drawing Sheets

RELATIONSHIP BETWEEN TAPE VELOCITY AND TAPE POSITION IN BACKHITCH

S1: VELOCITY AT WHICH PRECEDING TRANSACTION IS WRITTEN (CURRENT TAPE VELOCITY)
S2: VELOCITY AT WHICH NEXT TRANSACTION IS WRITTEN (NEXT TAPE VELOCITY)

| CURRENT VELOCITY S1 \ NEXT VELOCITY S2 | 5.455 | 4.773 | 4.092 | 3.41 | 2.728 | 2.046 |
|---|---|---|---|---|---|---|
| 5.455 | | 2.182 | | | | |
| 4.773 | 2.047871 | 2.047871 | 1.919081 | 1.796282 | 1.680843 | 1.574031 |
| 4.092 | 1.919081 | 1.9092 | 1.775612 | 1.647874 | 1.527577 | 1.416306 |
| 3.41 | 1.796282 | 1.775612 | 1.6368 | 1.503494 | 1.377506 | 1.260802 |
| 2.728 | 1.680843 | 1.64874 | 1.503494 | 1.364 | 1.231377 | 1.107992 |
| 2.046 | 1.574031 | 1.527577 | 1.377506 | 1.231377 | 1.0912 | 0.959647 |
| | | 1.416306 | 1.280802 | 1.107992 | 0.959647 | 0.8184 |

FIG. 7

CONTROLLING WRITING TO MAGNETIC TAPE

BACKGROUND OF THE INVENTION

Figure 1:
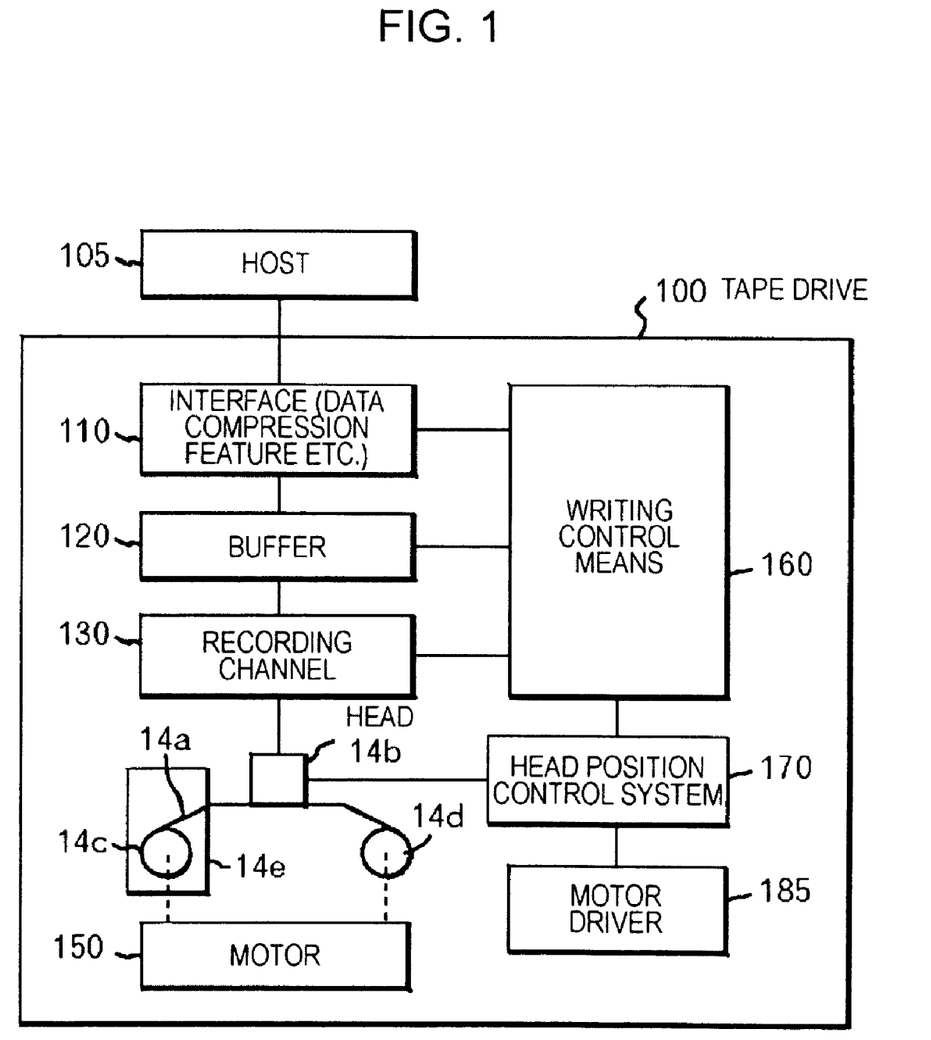
FIG. 1 shows a block diagram of a general tape drive.

A data writing operation in a general tape drive in which a known linear data writing method (for example, an LTO drive (Non-Patent Document 1)) is described in FIG. 1. FIG. 1 is a block diagram of a general tape drive 100. The tape drive 100 includes a buffer 120, a recording channel 130, a head 14b, a tape 14a, a cartridge 14e, a motor 150, writing controller 160, a head position control system 170, and a motor driver 185. The writing controller 160 receives a write command to write data (a record) received from a host 105 to the buffer 120 and a synchronous command (a Sync command) to forcibly write a plurality of pieces of data stored in the buffer 120 to the tape 14a. When the communication standard of an interface 110 is SCSI, a command to write data from the host 105 is a write command, and a Sync command is a Write FileMarks Non Immediate (Write FMO) command.

The writing controller 160 controls the motor driver 185 via the head position control system 170. When a predetermined amount of data or more is stored in the data buffer 120, the drive 100 (the writing controller 160) sequentially writes the data to the tape 14a. To ensure all of unwritten data in the buffer 120 is recorded to tape 14a, the host 105 usually issues a synchronous command to the drive. A synchronous command indicates a transaction by a break in host processing. When the drive receives a synchronous command from the host 105, the drive is forced to write data that remains in the buffer 120 to the tape 14a. The drive 100 includes a data compression function 110. By the default setting, data transferred from the host is usually compressed (for example, the compression ratio is 50%) and stored in the buffer 120 to be recorded on the tape 14a.

Figure 2:
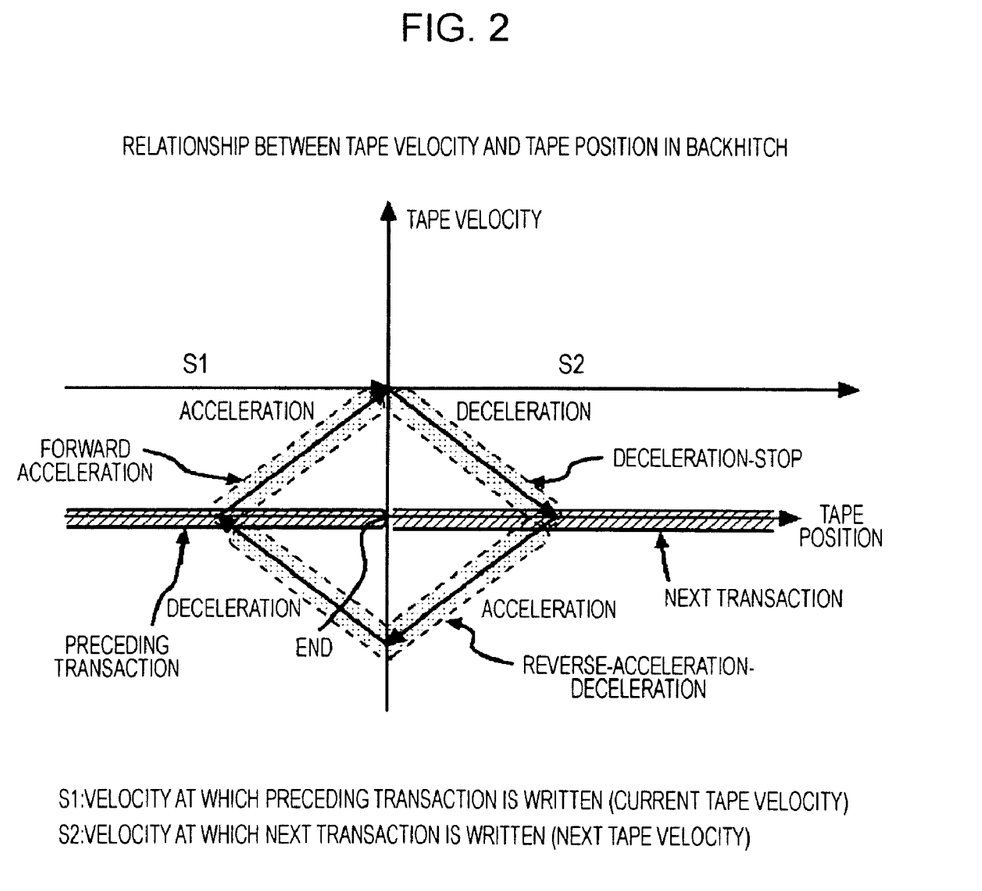
FIG. 2 shows a relationship between the tape position and the tape velocity (writing velocity) in backhitch operations.

FIG. 2 shows the relationship between the tape position and the tape velocity (writing velocity) in backhitch operations.

Upon the completion of each synchronous command, the following three backhitch operations are performed to write a plurality of following pieces of data (a single transaction):

The velocity S1 of a tape is decreased, and the tape is temporarily stopped (a deceleration-stop operation).

Then, the tape is reversed and accelerated. When a position corresponding to the end of a transaction data written just before has passed through the head 14b, the tape is decelerated and again stopped (a reverse-acceleration-deceleration operation by rewinding).

The tape is accelerated in the forward direction, and a position for writing the next transaction is reached at a tape running velocity S2 (a forward acceleration operation).

The backhitch operation reduces the room between pieces of data on a tape (the room between successive transactions) in writing the next transaction to the tape by these three operations, because the room causes the capacity loss on the tape.

Figure 3:
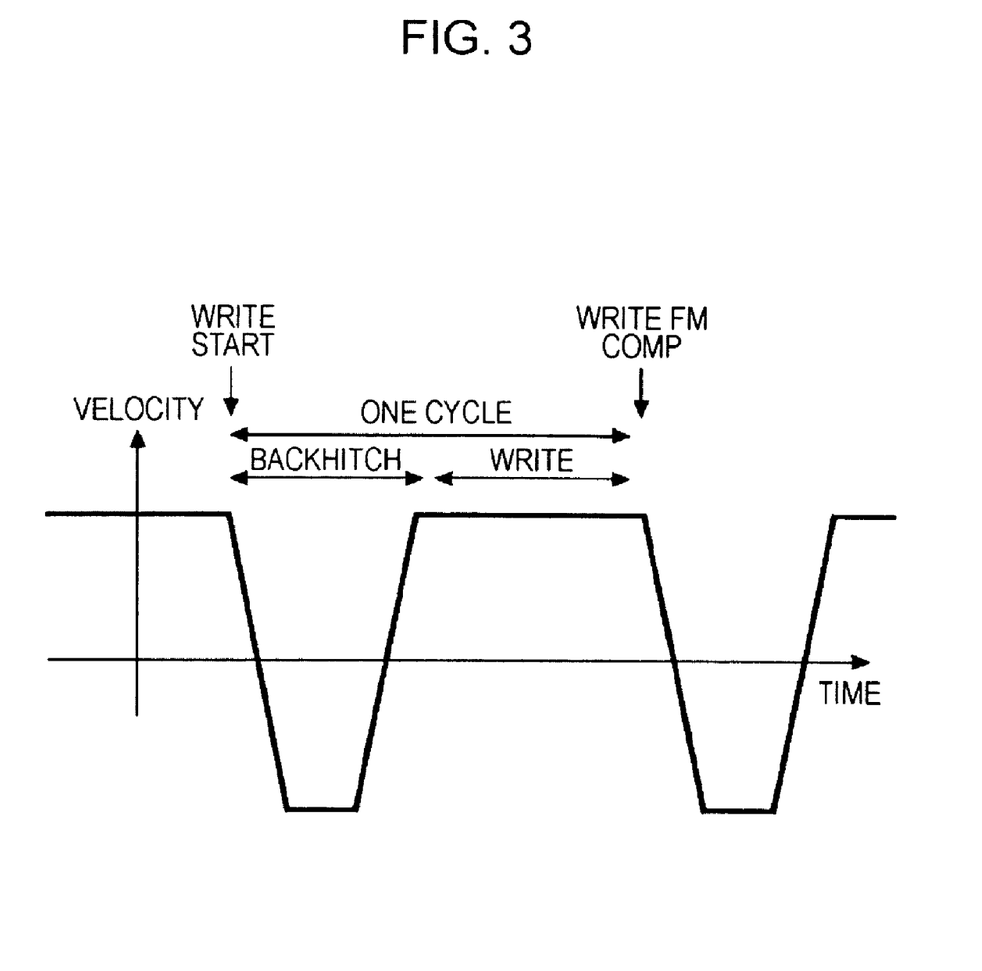
FIG. 3 shows that data may not be written to a tape during backhitch operations associated with the operation of each Sync command because the tape is being accelerated or decelerated.

FIG. 3 shows that drive cannot start to write data until backhitch operations associated with the operation of each Sync command are completed, because the tape is being accelerated or decelerated.

In a tape drive, backhitch operations that occur with each sync command take about two seconds. If a host issues sync commands to perform a lot of transactions, the backhitch operations cause a decrease in the performance of writing. Especially when Sync requests are successively issued, accelerated and decelerated time in backhitch is high percentage of the total time. Thus, it is preferable that the tape velocity (writing velocity) of a drive be optimized by the amount of records in a transaction.

In a magnetic tape subsystem that uses faster writing speed for a large amount of data, and uses slower writing speed for a small amount of data, as a result, the total time of transaction cycle will be short. If the next transaction size has been determined before drive starts a reverse-acceleration-deceleration operation in backhitching, the definitive velocity (the tape velocity and the writing velocity) for the next data can be determined.

SUMMARY OF THE INVENTION

The present invention relates to methods for controlling writing in magnetic tape units (tape drives and drives). In particular, the present invention relates to a method for controlling writing for reducing the effects of a backhitch that occurs when a synchronous command (a Sync request or a Sync command) is issued in a writing operation in a magnetic tape unit.

According to one embodiment of the invention, a method for controlling writing for a tape recorder that is connected to a host and sequentially records, as a transaction, a plurality of records that are transferred from the host and stored in a buffer is provided, including receiving a synchronous command for a first transaction from the host; in response to the synchronous command, sequentially writing the plurality of records stored in the buffer to a tape as the first transaction; receiving the size of a second transaction following the first transaction from the host; calculating time for a backhitch associated with an operation of the synchronous command for the first transaction on the basis of the size; and performing the backhitch on the basis of the time for the backhitch.

According to another embodiment of the invention, a tape recorder that is connected to a host and sequentially records a plurality of records upon receiving a command to write the plurality of records from the host is provided, including a buffer that temporarily stores the plurality of records; a tape on which the plurality of records stored in the buffer are recorded; a write head that writes the plurality of records stored in the buffer to the tape; and writing controlller for, in response to a synchronous command from the host, sequentially writing, to the tape, the plurality of records stored in the buffer as a first transaction, and after writing the first transaction, performing a backhitch for writing the next transaction, wherein the writing controller receives the size of the next transaction following the first transaction from the host and calculates time for the backhitch on the basis of the size.

According to yet another embodiment of the invention, a tape recording system is provided, including a host; and a tape recorder connected to the host.

According to yet another embodiment of the invention, a program product for controlling writing for a tape recorder that is connected to a host and sequentially records a plurality of records on a tape upon receiving a command to write the plurality of records from the host is provided, causing the tape recorder to perform in response to a synchronous command from the host, sequentially writing the plurality of records stored in a buffer to the tape as a first transaction; and receiving the size of a transaction following the first transaction from the host and calculating time for a backhitch associated with an operation of the synchronous command on the basis of the size.

DETAILED DESCRIPTION

While the invention will be described in its best mode with reference to the drawings, it is to be understood that the following embodiments do not limit the invention according to the claims and that all the combinations of the characteristics described in the invention are not absolutely necessary for solving the problems.

Figure 4:
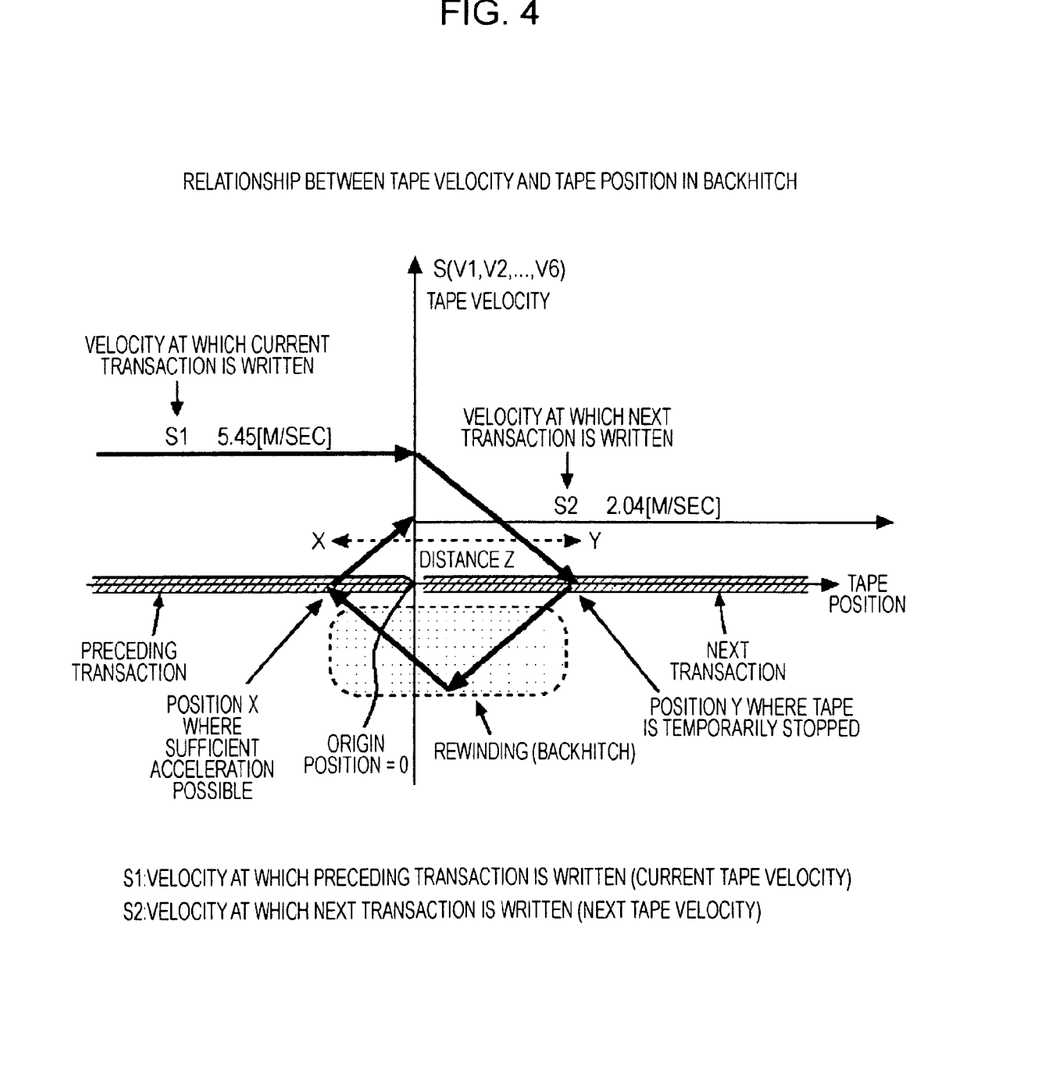
FIG. 4 shows, in backhitch operations, positions in which a tape is located respectively in the case of the current tape velocity S1 (V1=5.45 m/s) and in the case of the next tape velocity S2 (V6=2.046 m/s).

With reference now to FIG. 4, FIG. 4 shows, in backhitch operations, positions in which a tape is located respectively in the case of the current tape velocity S1 (V1=5.45 m/s) and in the case of the next tape velocity S2 (V6=2.046 m/s). Backhitch operations that occur with a Sync operation will be considered with reference to the drawing. The procedure for backhitching is as follows:

The velocity S1 of the tape is decreased, and a tape position Y is reached (a deceleration-stop operation).

Then, a position X to which the tape needs to be rewound from the position Y is calculated to have the velocity S2 at which a transaction data is written. In other words, the position X is a position from which the tape can be sufficiently accelerated (an acceleration A [m/s$^2$]) to the velocity S2, at which the next transaction is written.

After the tape is rewound to the position X, from which the tape can be sufficiently accelerated (the acceleration A) (a reverse-acceleration-deceleration operation by rewinding), the tape is accelerated until a target position (a position=0 in FIG. 4) is reached (a forward acceleration operation). The position Y and the position X can be determined respectively from S1 and S2:

$$Y(S1) = \frac{S1^2}{2A} \quad X(S2) = \frac{S2^2}{2A}. \quad \text{[Equation 1]}$$

Thus, a distance over which the tape needs to be rewound by backhitching is Z=Y(S1)+X(S2). Time K necessary for the tape to travel the distance Z is a function of the current tape velocity S1 and the next tape velocity S2 and is represented as:

$$K(S1, S2) = 2\sqrt{\frac{(Y(S1) + X(S2))}{A}}. \quad \text{[Equation 2]}$$

The foregoing three equations are derived from the equation of uniformly accelerated motion (v=at, x=(½)at$^2$, where v, x, a, and t are velocity, position, acceleration, and time, respectively).

Time T necessary for backhitching is represented as a function of S1 and S2. Specifically, the time T is given by the following equation, i.e., (time necessary to decrease S1)+(time necessary for rewinding over the distance Z necessary for acceleration)+(time necessary to increase the velocity to S2):

[Equation 3]

$$T(S1, S2) = \frac{S1}{A} + K(S1, S2) + \frac{S2}{A}. \quad (1)$$

Next, the ratio between backhitch time and write time in a case where write processing (a write command: storing data in a buffer) and synchronization processing (a Sync command) are successively performed is evaluated. It is assumed that, in a host, the time between when the current synchronization processing is completed and when writing processing and synchronization processing of the next transaction are completed corresponds to one cycle of writing to a tape. Assuming that a tape velocity at the time of the completion of the current synchronization processing is S1, a tape velocity at which the next write processing is performed is S2, the transaction size is D, and the recording density of data on a tape is d [MByte/meter], write completion time W$_{time}$, including backhitch time T, is given by the following equation as a function of S2:

[Equation 4]

$$W_{time}(S2) = T(S1, S2) + \frac{D}{dS2}. \quad (2)$$

When S2 that minimizes the result of equation (2) is selected as the tape velocity of a drive, the time of one cycle after the completion of synchronization processing of the preceding transaction, through backhitching, until the completion of synchronization processing of the next transaction can be minimized. In an actual writing operation, the velocity S2, at which the next transaction is written, needs to be determined at the time of the start of backhitching after synchronization processing of the preceding transaction.

For example, in the case of a third generation LTO tape drive, six tape velocities V1=5.455, V2=4.773, V3=4.092, V4=3.41, V5=2.728, and V6=2.046 are assigned to the velocity S1 and the velocity S2 [m/sec], at which the next data is written. The next velocity S2 that minimizes the result of equation (2) using the data recording density d=14.67 [MByte/meter] is selected. When a transaction data transferred from a host is compressed and stored in a buffer to be recorded on a tape, the data size D takes a value in which the compression ratio is considered.

Figure 5:
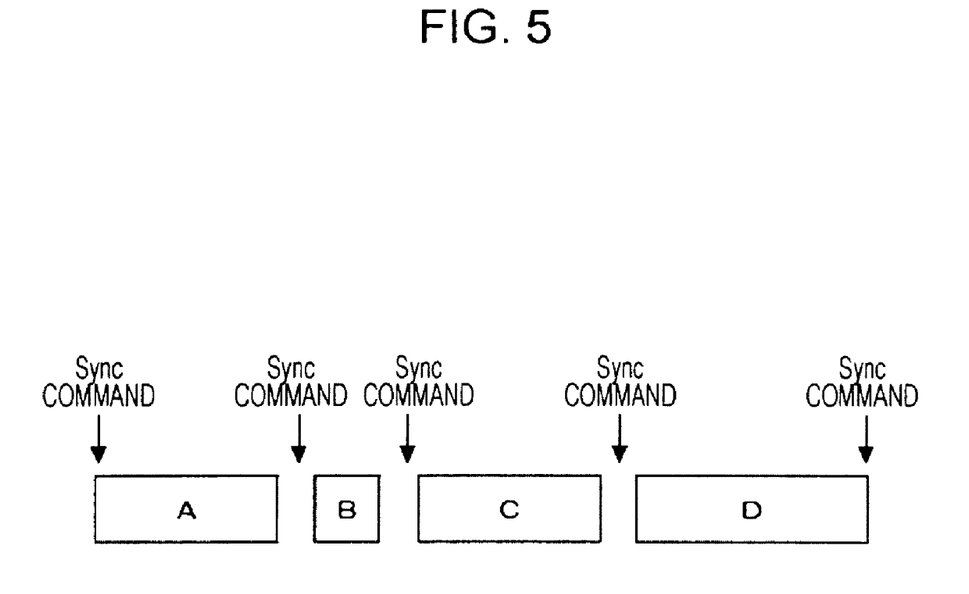
FIG. 5 shows a case where a host forcibly writes records A, B, C, and D to a tape as transactions by Sync commands.

FIG. 5 shows a case where a host forcibly writes records A, B, C, and D to a tape as transactions by Sync commands. The sizes (transaction sizes) of the transactions A, B, C, and D are different. In the actual use of host applications, since a Sync command is issued at a selected break in processing, the transaction size varies.

For example, after the data B is written, the tape is stopped, and backhitching is started. In a case where the amount of the data C is equal to or more than a predetermined amount, at the time when the position Y (FIG. 4) is reached, in the tape drive, the transaction size of the next transaction C is not determined yet. Because the size of data C is large and all of data C has not been transferred from host yet, and Sync command has not been received. When the distance over which the tape is rewound is too large, backhitching is performed more than necessary On the other hand, when the distance over which the tape is rewound is too small, since an additional operation of further rewinding the tape to the optimum tape position is necessary, the backhitch time becomes longer. In both cases, the tape is rewound to the inaccurate position X (FIG. 4) in a backhitch operation, thereby the performance of writing is not minimized. Especially in writing involving frequent backhitching, in each backhitch, the overall performance of writing is significantly influenced because the size of the next transaction cannot be determined.

Figure 6:
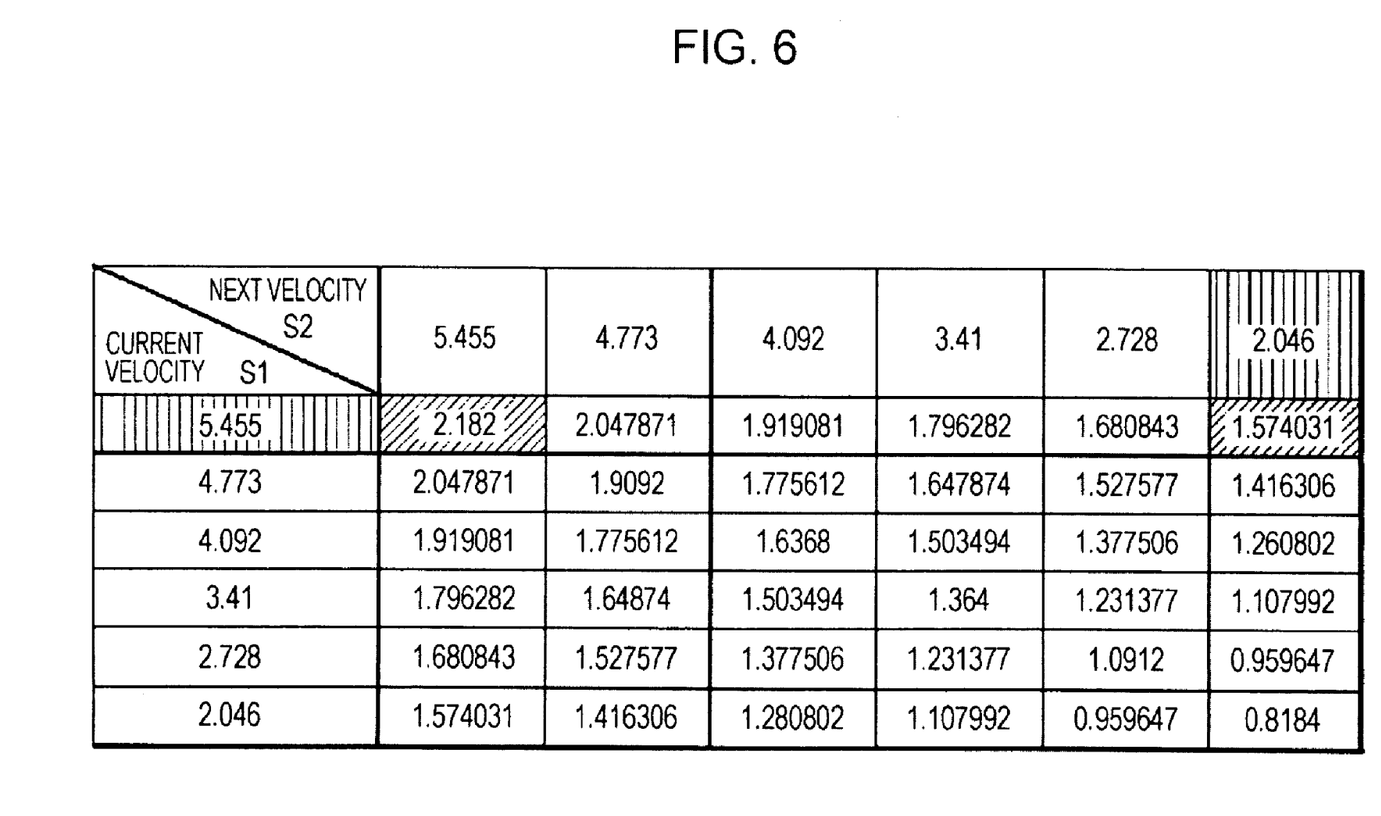
FIG. 6 is a table obtained by substituting V1, V2, . . . , V6 into the current writing velocity S1 and the next writing velocity S2 in equation (1) of backhitch time T(S1, S2).

FIG. 6 is a table obtained by substituting V1, V2, ..., V6 into the current writing velocity S1 and the next writing velocity S2 in equation (1) of the backhitch time T(S1, S2). This table gives backhitch times in the case of a third generation LTO tape drive when the values of S1 and S2 range from V1 to V6 with the acceleration A=10 [m/sec$^2$].

In equation (1), it is assumed that the optimum velocity S1 for writing the data B is V1=5.45 [m/sec] (a shaded portion), and the optimum velocity S2 for writing the data C is V6=2.046 [m/sec] (a shaded portion). The drive is driven at the current velocity S1 of 5.45 [m/sec] to write the data B. When the size of the next data C is not determined at the time of the start of backhitching, the next velocity S2, which is optimum, cannot be selected. For example, in the drive, when the data C is written at a velocity of 5.45 [m/sec] that is the same as the current velocity S1 the position X (FIG. 4) moves back more than necessary. The shaded portions in FIG. 6 show that a time of 0.608 (=2.182-1.574) seconds is wasted in backhitch operations just before starting to write the data C. The present invention enables the drive to obtain the size of the next data C at least before a reverse-acceleration-deceleration operation in backhitch operations just before writing the data C. In this arrangement, in the drive, since the next tape velocity S2=2.046, which is optimum, can be selected on the basis of equation (1), a write time loss of 0.608 seconds can be eliminated.

The following processes are necessary so as to implement an embodiment of the present invention:

An interface through which a host can specify the size of the next transaction is prepared on the side of a drive. For example, a WriteFM command (Sync command) is extended so that the transaction size of data to be written next can be specified.

Thus, a function (queuing or queue) of waiting in a queue of writing processes is provided on the side of the host. The size of the next transaction needs to be determined before a Sync command is issued. In this way, a notification of the size of a transaction can be sent to the drive simultaneously with a Sync command or individually at least before the start of a reverse-acceleration-deceleration operation. Note that the queue function cannot be provided on the side of the drive, since the drive cannot receive the next data until the completion of a Sync command due to the specifications of communication protocols including SCSI.

When the drive receives the size of the next transaction from the host, the drive determines the next tape velocity S2 and the position X, to which a tape is rewound in backhitching, when backhitching is performed, using the size of the next transaction.

Figure 7:
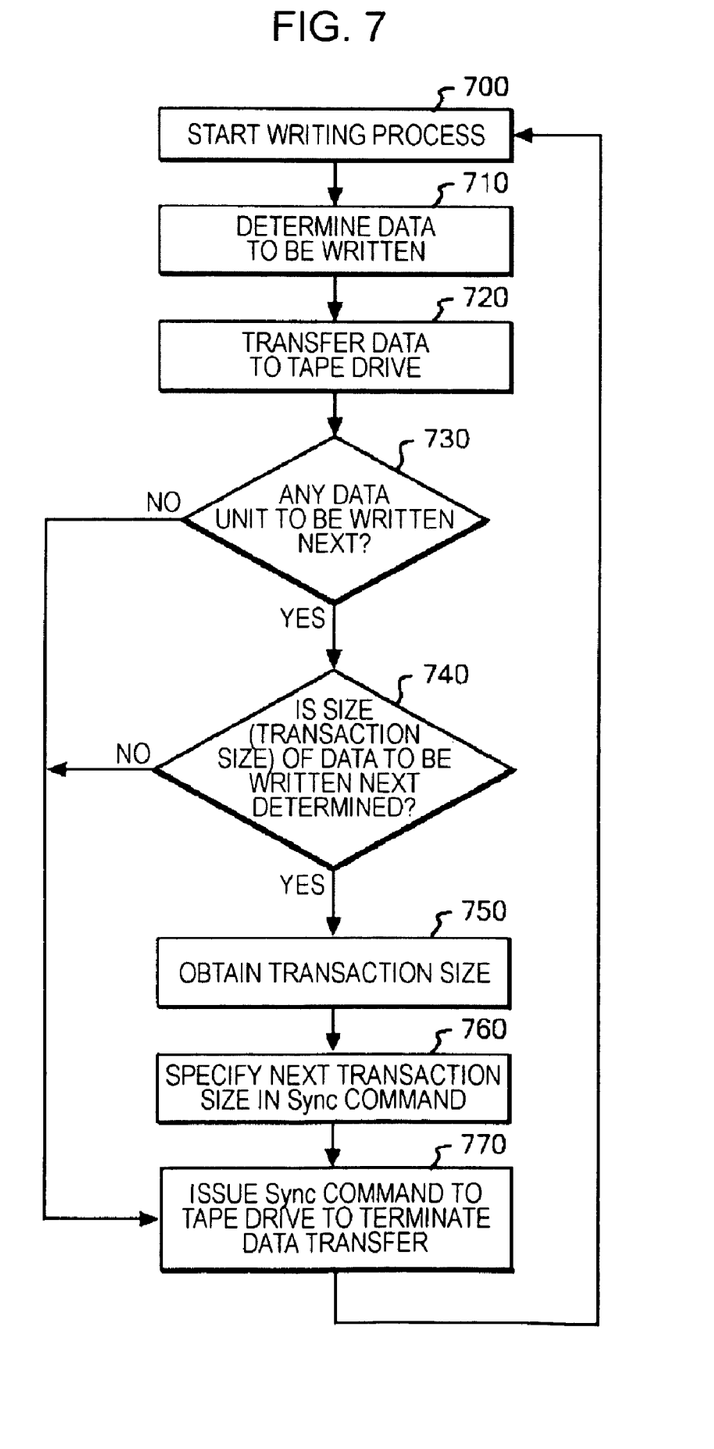
FIG. 7 shows a flowchart of a process on the side of a host application.

FIG. 7 is a flowchart of a process (700) on the side of a host application. Specifically, the flowchart shows a flow in which a host sends data and the size of a transaction to a tape drive.

The host determines data to be written (710).

The host transfers data of a predetermined size to the tape drive (720).

When the host transfers the data, the host determines whether any data unit to be written next exists (730).

When any data unit to be written next exists, the host determines whether the size of the next transaction is determined (740). The host specifies one or more pieces of data (record) as a transaction. This determination means that the host includes the function of queuing the next transaction or the size of the next transaction.

When the size (transaction size) of the next data is determined, the host obtains the transaction size (the queue function) (750).

The host assigns the transaction size to a newly extended parameter in a Sync command (760).

The host issues a Sync command (for example, WriteFM Immediate) in which the next transaction size is embedded to the tape drive to terminate data transfer (770). In this case, the data size of the next transaction may be sent to the drive using another command immediately after the Sync command at least before the start of a reverse-acceleration-deceleration operation in backhitching.

Next, a process in a case where the tape drive receives the next transaction size and a Sync command from the host includes the following steps 1 to 3:

When the drive receives a Sync command from the host, the drive also receives the next transaction size simultaneously with the Sync command.

When a transaction size (D in equation (2)) is specified in the Sync command received by the drive, the value of S2 that minimizes W$_{time}$ in equation (2) is selected from one of V1 to V6.

Backhitch operations for writing at the next velocity S2 are started.

Backhitch operations that take the time T(S1, S2), which is the first term of equation (2), and an operation of writing the next transaction that takes the time D/dS2, which is the second term of equation (2), are performed using the next velocity S2 selected in step 2. These backhitch operations enable selection of the optimum writing velocity S2 even when the transaction size is equal to or more than a predetermined size. Thus, losses in the overall performance of writing can be reduced.

Figure 8:
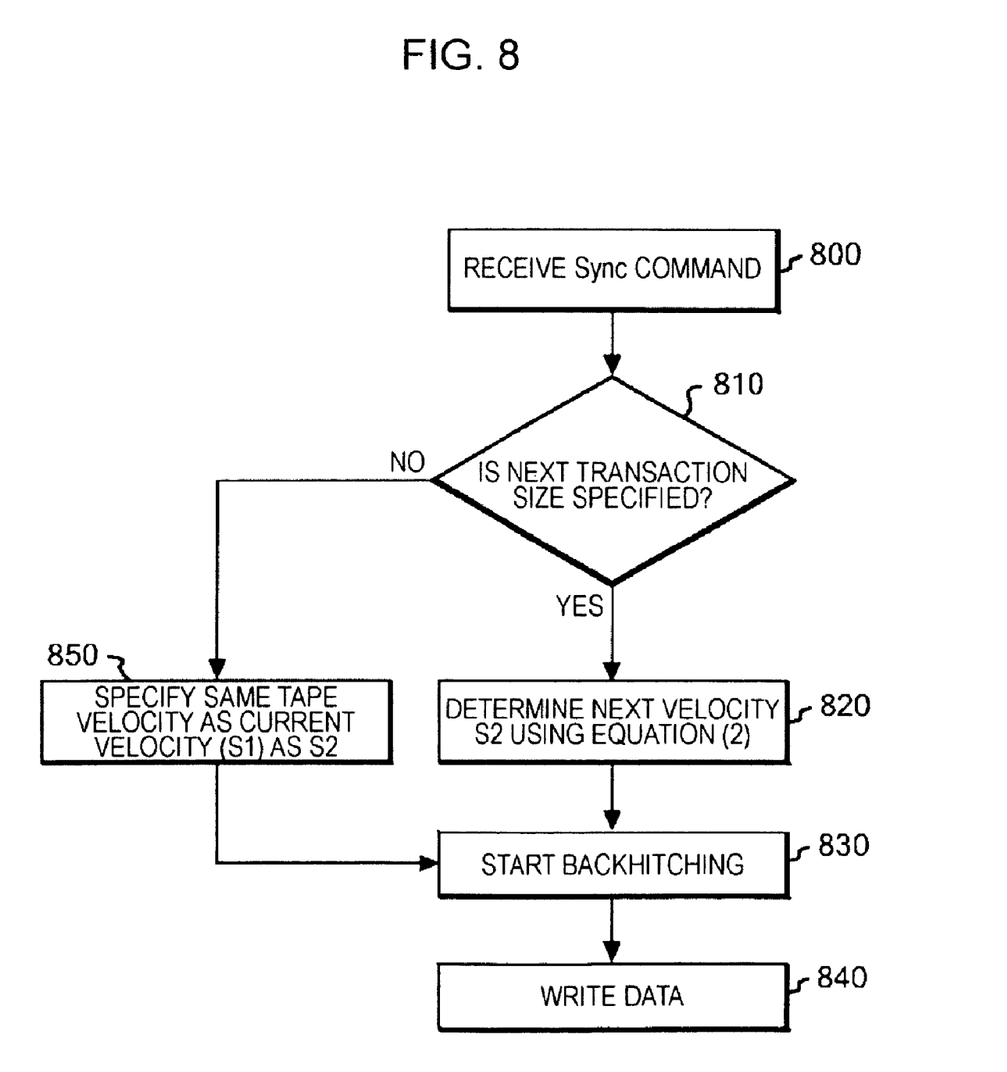
FIG. 8 shows a flowchart showing the details of a writing operation at the time when a tape drive receives a Sync command and the next transaction size from a host.

FIG. 8 is a flowchart showing the details of a writing operation when the tape drive receives a Sync command and the next transaction size from the host.

The host starts to transfer a plurality of pieces of data, and the drive receives the pieces of data and sequentially stores the pieces of data in a data buffer.

When a predetermined amount of data or more is stored in the data buffer, the drive sequentially writes the data to a tape. The drive receives a Sync command from the host while a predetermined amount of data or less is stored in the buffer (800).

The drive determines whether the next transaction size is specified in the extended parameter in the Sync command (810). When the next transaction size is specified, backhitch operations (830) and an operation of writing the next transaction (840) are performed while the next transaction is being stored in the data buffer. When the next transaction size is not specified, backhitch operations and other operations (830, 840) are performed after the same velocity as the current writing velocity S1 is specified as the velocity S2 at the next transaction is written (850).

When the size of the next transaction cannot be determined (850), the value of S2 need not necessarily be the same as that of S1. However, in such a case, assigning the maximum value to S2, assuming that the size (D in equation (2)) is large, is effective at improving the overall performance of writing. This is because, in the write completion time $W_{time}(S2)$ in equation (2), when it is assumed that the size D is large, and S2 is small, the second term D/dS2 of equation (2) is large compared with the backhitch time T(S1, S2), which is the first term, and thus it is useless to reduce the backhitch time.

In the aforementioned embodiment, a method for controlling writing in a tape recorder in which data is sequentially written to a tape is disclosed. In the method for controlling writing, a host sends a notification of the size of the next transaction to a tape recorder at least before an operation of rewinding a tape in backhitching so as to optimize the distance over which the tape is rewound in a manner that depends on the size. Thus, the overall performance of writing can be improved.

While the present invention has been described with respect to its embodiment, the technical scope of the present invention is not limited to the scope described in the above embodiment. Thus, it is apparent to those skilled in the art that various modifications or improvements may be made to the above embodiment. Therefore, embodiments with such modifications or improvements naturally fall within the technical scope of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for controlling writing for a tape recorder that is connected to a host and sequentially records, as a transaction, a plurality of records that are transferred from the host and stored in a buffer, the method comprising:
   receiving a synchronous command for a first transaction from the host;
   in response to the synchronous command, sequentially writing the plurality of records stored in the buffer to a tape as the first transaction;
   receiving the size of a second transaction following the first transaction from the host;
      calculating time for a backhitch associated with an operation of the synchronous command for the first transaction on the basis of the size; and
      performing the backhitch on the basis of the time for the backhitch.

2. The method according to claim 1, wherein receiving the size receives the size of the second transaction at least before rewinding in the backhitch is started.

3. The method according to claim 2, wherein receiving the size receives the size of the second transaction simultaneously with the step of receiving the synchronous command for the first transaction.

4. The method according to claim 2, wherein calculating the time for the backhitch minimizes the time for the backhitch by determining, on the basis of the size, a position with respect to a head, at the time of performing the backhitch.

5. The method according to claim 2, wherein calculating the time for the backhitch minimizes the time for the backhitch by determining, on the basis of the size, a velocity at which the second transaction is written.

6. The method according to claim 1, further comprising:
   temporarily storing a plurality of other records transferred from the host in the buffer as the second transaction;
   receiving a synchronous command for the second transaction from the host; and
   after performing the backhitch, in response to the synchronous command for the second transaction, sequentially writing, to the tape, the plurality of other records stored in the buffer as the second transaction.

7. A tape recorder that is connected to a host and sequentially records a plurality of records upon receiving a command to write the plurality of records from the host, comprising:
   a buffer that temporarily stores the plurality of records;
   a tape on which the plurality of records stored in the buffer are recorded;
   a write head that writes the plurality of records stored in the buffer to the tape; and
   writing controller for, in response to a synchronous command from the host, sequentially writing, to the tape, the plurality of records stored in the buffer as a first transaction, and after writing the first transaction, performing a backhitch for writing the next transaction,
   wherein the writing controller receives the size of the next transaction following the first transaction from the host and calculates time for the backhitch on the basis of the size.

8. The tape recorder according to claim 7, wherein the writing controller receives the size of the next transaction at least before rewinding in the backhitch is started.

9. The tape recorder according to claim 8, wherein the writing controller receives the size of the next transaction upon receiving the synchronous command for the first transaction.

10. The tape recorder according to claim 7, wherein the writing controller minimizes the time for the backhitch on the basis of the size of the next transaction.

11. A program product for controlling writing for a tape recorder that is connected to a host and sequentially records a plurality of records on a tape upon receiving a command to write the plurality of records from the host, the program product causing the tape recorder to perform:

in response to a synchronous command from the host, sequentially writing the plurality of records stored in a buffer to the tape as a first transaction; and receiving the size of a transaction following the first transaction from the host and calculating time for a backhitch associated with an operation of the synchronous command on the basis of the size.

* * * * *